United States Patent
Recio et al.

(10) Patent No.: US 10,281,028 B2
(45) Date of Patent: May 7, 2019

(54) SHIFTER LOCATION SYSTEM FOR A MOTOR VEHICLE

(71) Applicant: Dura Operating, LLC, Auburn Hills, MI (US)

(72) Inventors: Mario Arturo Recio, Rochester Hills, MI (US); Alberto Polonio Morales, West Bloomfield, MI (US); Daniel William Raikes, II, Rochester Hills, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 358 days.

(21) Appl. No.: 15/350,591

(22) Filed: Nov. 14, 2016

(65) Prior Publication Data
US 2017/0343103 A1     Nov. 30, 2017

Related U.S. Application Data

(60) Provisional application No. 62/341,944, filed on May 26, 2016.

(51) Int. Cl.
    *F16H 59/04*      (2006.01)
    *F16H 59/10*      (2006.01)
    (Continued)

(52) U.S. Cl.
    CPC ....... *F16H 59/105* (2013.01); *F16H 59/0204* (2013.01); *F16H 59/044* (2013.01);
    (Continued)

(58) Field of Classification Search
None
See application file for complete search history.

(56) References Cited

U.S. PATENT DOCUMENTS 4,610,179 A * 9/1986 Parker .................... F16H 59/08
                                                  200/61.88
4,981,202 A * 1/1991 Leigh-Monstevens ......................
                                                   B60W 10/06
                                                    192/3.56
(Continued)

FOREIGN PATENT DOCUMENTS

CN          201385577 Y      1/2010
CN          204061845 U      12/2014
(Continued)

*Primary Examiner* — William Kelleher
*Assistant Examiner* — Gregory T Prather
(74) *Attorney, Agent, or Firm* — Robert E. Ford; Raymond J. Vivacqua; Steven L. Crane (57) ABSTRACT

A shifter assembly in a motor vehicle includes a shifter housing. A shifter lever having first and second ends is coupled to the shifter housing at the second end. The shifter lever is rotatable about a pivot axis and is translatable parallel to the pivot axis. The shifter assembly has first and second 2-Dimensional (2D) magnetic sensors, and first and second magnets. The first magnet is coupled to the shifter lever between the first and second ends, proximate the first sensor, and has a first magnetic field in radial alignment with the shifter lever. The second magnet is coupled to the shifter lever between the first and second ends, proximate the second sensor, and has a second magnetic field perpendicular to the first magnetic field. The first sensor detects an angular displacement of the first magnetic field, and the second sensor detects an axial displacement of the second magnetic field.

20 Claims, 4 Drawing Sheets

(51) Int. Cl.
  *F16H 59/02*   (2006.01)
  *G01D 5/14*   (2006.01)
  *G05G 9/047*   (2006.01)

(52) U.S. Cl.
  CPC ............ *F16H 59/10* (2013.01); *G01D 5/145* (2013.01); *F16H 2059/0265* (2013.01); *G05G 2009/04755* (2013.01)

(56) References Cited

U.S. PATENT DOCUMENTS

| | | | |
|---|---|---|---|
| 5,178,042 A | 1/1993 | Moroto et al. | |
| 5,243,871 A * | 9/1993 | Weiten | F16H 59/02 74/473.12 |
| 5,307,013 A * | 4/1994 | Santos | F16H 59/105 324/207.2 |
| 6,140,898 A * | 10/2000 | Satoh | F16H 59/105 200/11 R |
| 6,154,107 A * | 11/2000 | Tomotoshi | F16H 59/105 200/61.88 |
| 6,530,293 B1 * | 3/2003 | Ruckert | F16H 59/105 324/207.23 |
| 6,848,332 B2 * | 2/2005 | Hayashi | F16H 59/0278 74/473.21 |
| 7,334,496 B2 * | 2/2008 | Ersoy | F16H 59/105 324/207.2 |
| 7,597,023 B2 | 10/2009 | Kortge et al. | |
| 7,621,198 B2 * | 11/2009 | Kako | F16H 59/0278 116/28.1 |
| 8,170,757 B2 * | 5/2012 | Furhoff | B60K 37/06 70/248 |
| 8,350,560 B2 * | 1/2013 | Kammer | F16H 59/044 324/207.2 |
| 8,720,294 B2 * | 5/2014 | Kim | F16H 59/105 74/473.3 |
| 8,739,647 B2 * | 6/2014 | Benson | F16H 59/044 74/473.1 |
| 9,303,756 B2 * | 4/2016 | Yamamoto | F16H 59/105 |
| 9,719,595 B2 * | 8/2017 | Bur | F16H 63/502 |
| 9,879,775 B2 * | 1/2018 | Kwon | F16H 59/105 |
| 9,939,060 B2 * | 4/2018 | Kato | F16H 59/105 |
| 10,107,388 B2 * | 10/2018 | Beattie | F16H 59/105 |
| 10,151,385 B2 * | 12/2018 | Voelz | F16H 59/105 |
| 2015/0048816 A1 | 2/2015 | Derouet et al. | |

FOREIGN PATENT DOCUMENTS

| | | |
|---|---|---|
| EP | 1482214 A2 | 12/2004 |
| JP | 2007099258 A | 4/2007 |
| WO | 0111271 A1 | 2/2001 |

* cited by examiner

SHIFTER LOCATION SYSTEM FOR A MOTOR VEHICLE

CROSS REFERENCE TO RELATED APPLICATIONS

This application claims the benefit of U.S. Provisional Patent Application No. 62/341,944, filed on May 26, 2016, the entire contents of which are incorporated herein by reference.

FIELD

The present invention relates to a shifter assembly for a motor vehicle, and in particular, to a shifter assembly for a motor vehicle having an anisotropic magnetoresistance sensor that detects a shifter lever position.

BACKGROUND

The statements in this section merely provide background information related to the present disclosure and may or may not constitute prior art.

In a motor vehicle equipped with an automatic transmission, a shifter mechanism typically includes a shifter or control lever mounted within the motor vehicle's passenger compartment. The shifter lever is used by an operator of the motor vehicle to select one of a plurality of transmission operating modes. For example, these transmission operating modes may include park (P), reverse (R), neutral (N), drive (D), and may, in some configurations, include a low gear or manual mode (M), manual shift up (M+), and manual shift down (M−). To select transmission modes, the operator of the motor vehicle moves the shifter lever about an axis of rotation corresponding to the P, R, N, D positions. The shifter lever may, in some configurations, also be moveable about a second axis of rotation corresponding to the M, M+, M—positions. A shifter position signal is generated by a shifter location system and transmitted from the shifter location system to the transmission, where the transmission selects the drive mode corresponding to the shifter lever position. The shifter position signal may be a physical signal, or an electronic signal. Typically, the shifter position signal may be generated by a combination of Hall-effect sensors or optical sensors particularly arranged to provide a 3-D map of the shifter lever position. While these systems are useful for their intended purpose, there is a need in the art for improved shifter location systems that do not increase the cost or packaging size of the shifter location system, while also increasing the accuracy and robustness of the system and providing additional redundant safety features.

SUMMARY

In one aspect of the present invention, a shifter assembly in a motor vehicle includes a shifter housing. The shifter assembly further includes a shifter lever having a first end and a second end, the shifter lever coupled to the shifter housing at the second end. The shifter lever is rotatable about a pivot axis at the second end and is translatable in a direction generally parallel to the pivot axis. The shifter assembly further includes a first 2-Dimensional (2D) magnetic sensor. The shifter assembly further includes a first magnet having a first magnetic field. The first magnet is coupled to the shifter lever between the first end and the second end, and the first magnet is disposed proximate the first 2D magnetic sensor. The shifter assembly further includes a second 2D magnetic sensor. The shifter assembly further includes a second magnet having a second magnetic field. The second magnet is coupled to the shifter lever between the first end and the second end, and the second magnet is disposed proximate the second 2D magnetic sensor. The first magnetic field is in radial alignment with the shifter lever and the second magnetic field is oriented perpendicular to the first magnetic field. The first 2D magnetic sensor detects an angular displacement of the first magnetic field when the shifter lever is rotated, and the second 2D magnetic sensor detects an axial displacement of the second magnetic field relative to the pivot axis when the shifter lever is translated.

In another aspect of the present invention the first 2D magnetic sensor detects an angular orientation of the first magnetic field, and the second 2D magnetic sensor detects an angular orientation of the second magnetic field.

In yet another aspect of the present invention at least one of the first and second 2D magnetic sensors is an anisotropic magnetoresistance (AMR) sensor.

In yet another aspect of the present invention at least one of the first and second 2D magnetic sensors is a Hall-Effect sensor.

In yet another aspect of the present invention the first and the second 2D magnetic sensors are AMR sensors.

In yet another aspect of the present invention the first magnet is disposed axially adjacent the second magnet.

In yet another aspect of the present invention the first 2D magnetic sensor is configured to detect a rotational movement of the first magnet.

In yet another aspect of the present invention the second 2D magnetic sensor is configured to detect a movement of the second magnet in an axial direction relative to the pivot axis.

In yet another aspect of the present invention the first 2D magnetic sensor and the second 2D magnetic sensor are configured to detect a movement of the first magnet and the second magnet in both the rotational and the axial directions relative to the pivot axis.

In yet another aspect of the present invention a shifter location system in a motor vehicle includes a shifter housing. The shifter location system further includes a shifter lever having a first end, a second end, and a flange, the shifter lever being disposed within the shifter housing and rotatably coupled to the shifter housing at the second end. The shifter lever has a pivot axis at the second end and is translationally moveable in a direction generally parallel to the pivot axis, and the flange is disposed between the first and second ends of the shifter lever. The shifter location system further includes a circuit board disposed within the shifter housing, the circuit board being disposed adjacent to the shifter lever in a plane perpendicular to the pivot axis of the shifter lever. The shifter location system further includes a first two-dimensional (2D) magnetic sensor disposed on a first side of the circuit board and in electrical communication with the circuit board. The shifter location system further includes a first magnet having a first magnetic field. The first magnet is coupled to the shifter lever between the first end and the second end, and the first magnetic field is in radial alignment with the shifter lever, and the first magnet is disposed adjacent to the first 2D magnetic sensor such that the first 2D magnetic sensor is in magnetic communication with the first magnet. The shifter location system further includes a second 2D magnetic sensor disposed on a second side of the circuit board and in electrical communication with the circuit board. The second side of the circuit board is disposed proximate to the flange. The shifter location system further includes a second magnet having a second magnetic field. The second magnet is coupled to the flange of the shifter lever, and the second magnetic field is oriented perpendicular to the first magnetic field. The second magnet is disposed adjacent to the second 2D magnetic sensor such that the second 2D magnetic sensor is in magnetic communication with the second 2D magnet. The first 2D magnetic sensor detects an angular displacement of the first magnetic field, and the second 2D magnetic sensor detects an axial displacement of the second magnetic field relative to the pivot axis.

In yet another aspect of the present invention the first 2D magnetic sensor detects an angular orientation of the first magnetic field, and the second 2D magnetic sensor detects an angular orientation of the second magnetic field.

In yet another aspect of the present invention at least one of the first and second 2D magnetic sensors is a Hall-Effect sensor.

In yet another aspect of the present invention the first 2D magnetic sensor and the second 2D magnetic sensor are anisotropic magnetoresistance (AMR) sensors.

In yet another aspect of the present invention the first magnet is disposed axially adjacent the second magnet.

In yet another aspect of the present invention the first 2D sensor is configured to detect a rotational displacement of the first magnet.

In yet another aspect of the present invention the second 2D sensor is configured to detect an axial displacement of the second magnet.

In yet another aspect of the present invention the first 2D sensor and the second 2D sensor are configured to detect a movement of the first magnet and the second magnet in both the rotational and the axial directions.

In yet another aspect of the present invention a shifter location system in a motor vehicle includes a shifter housing. The shifter location system further includes a shifter lever having a first end and a second end. The shifter lever being disposed within the shifter housing and rotatably coupled to the shifter housing at the second end. The shifter lever has a pivot axis at the second end and is translationally moveable in a direction generally perpendicular to the pivot axis. The shifter location system further includes a circuit board disposed within the housing. The shifter location system further includes a first anisotropic magnetoresistance (AMR) sensor disposed on and in electrical communication with the circuit board. The shifter location system further includes a first magnet having a first magnetic field. The first magnet is coupled to the shifter lever between the first end and the second end, the first magnetic field is oriented in radial alignment with the shifter lever, and the first magnet is disposed proximate the first AMR sensor. The shifter location system further includes a second AMR sensor disposed on and in electrical communication with the circuit board. The shifter location system further includes a second magnet having a second magnetic field. The second magnet is coupled to the shifter lever between the first end and the second end, the second magnetic field is oriented perpendicular to the first magnetic field, and the second magnet is disposed proximate the second AMR sensor, and the first AMR sensor detects an angular displacement of the first magnetic field, and the second AMR sensor detects an axial displacement of the second magnetic field.

In yet another aspect of the present invention the first magnet is disposed axially adjacent the second magnet.

In yet another aspect of the present invention the first AMR sensor is disposed axially adjacent to the first magnet, and the second AMR sensor is disposed radially adjacent the second magnet.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
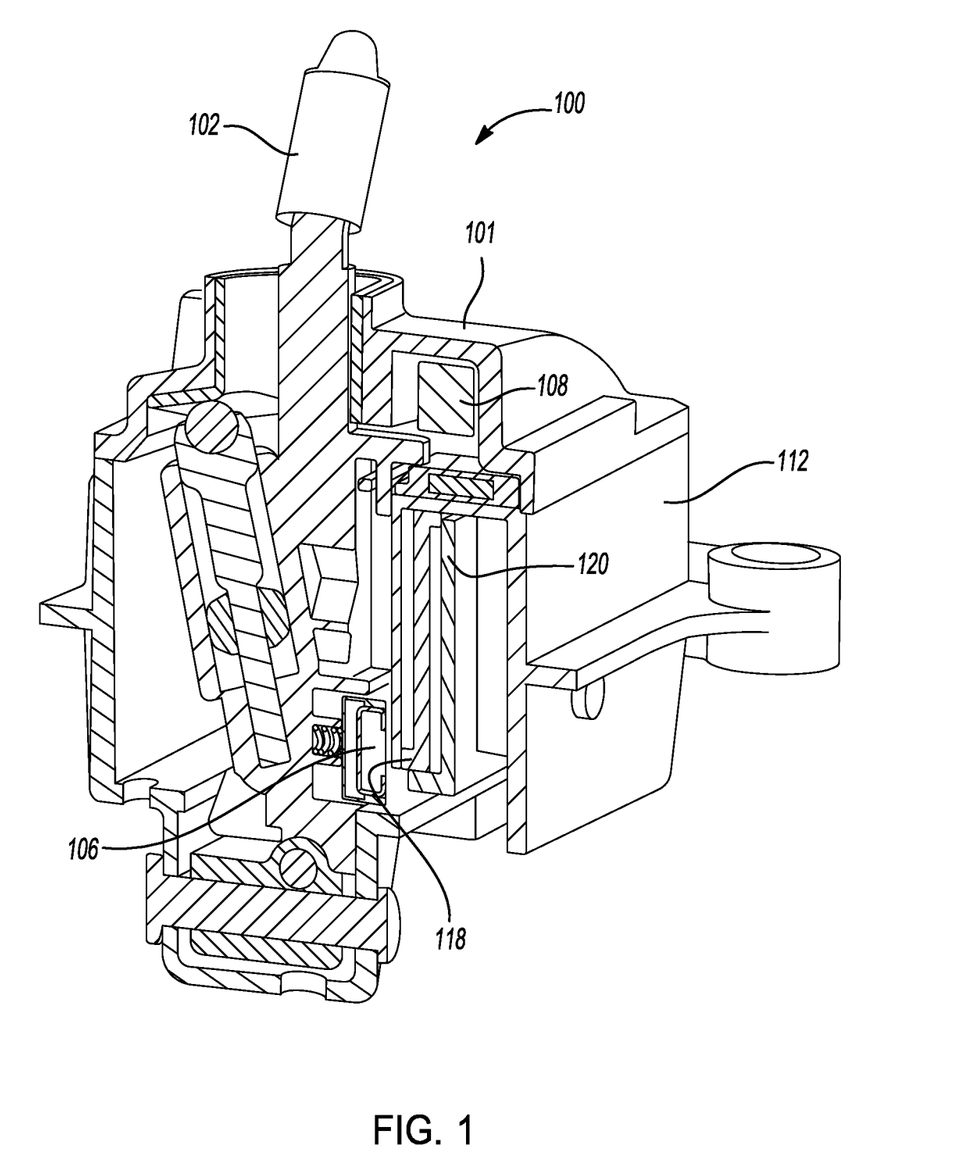
FIG. 1 is a perspective view of an exemplary shifter assembly for a motor vehicle having a shifter location system, according to the principles of the present invention.
Figure 2:
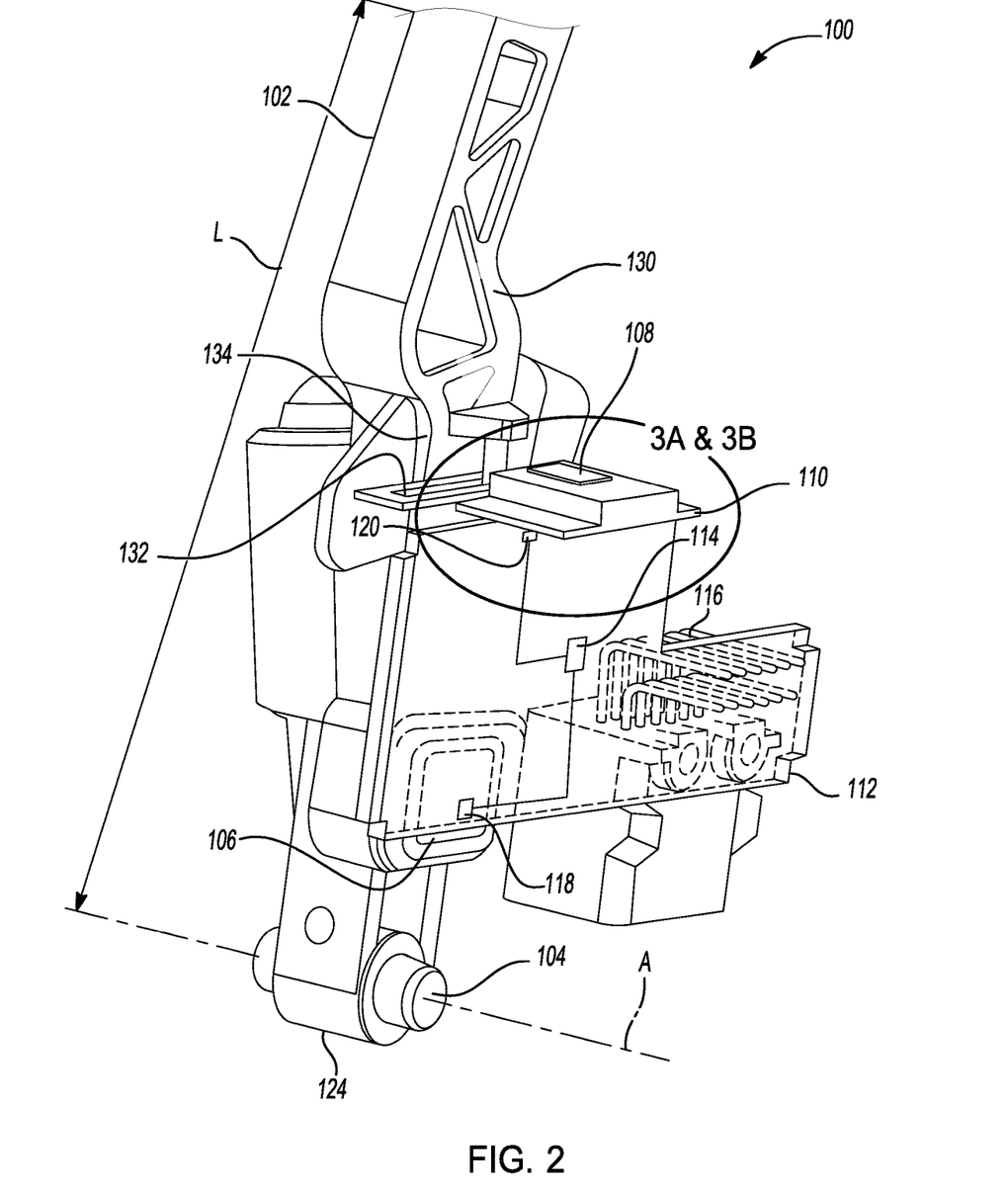
FIG. 2 is a perspective view of a portion of an exemplary shifter assembly for a motor vehicle having a shifter location system, according to the principles of the present invention.

With reference to FIGS. 1 and 2, a shifter assembly is generally indicated by reference number 100 and is illustrated in a neutral, energized position, as will be described below. The shifter assembly 100 is employed within a motor vehicle (not shown). The shifter assembly 100 is controlled by an operator of the motor vehicle to select one of a plurality of shift positions. The shift positions may be selected by movement of the shifter assembly 100 rotationally and axially. Each of the shift positions corresponds to an operating mode of a transmission (not shown) associated with the shifter assembly 100 and the motor vehicle. For example, the shifter assembly 100 may include a park (P), reverse (R), neutral (N), and drive (D). It should be appreciated that the number of shift positions, as well as the associated transmission operating modes, may vary without departing from the scope of the present example. For example, the shifter assembly 100 may also include manual modes M, M+, and M− and/or high gear and low gear operating modes. The shifter assembly 100 may be associated with an automatic transmission or any other type of transmission including a manual transmission, continuously variable transmission, etc.

The shifter assembly 100 generally includes a shifter housing 101, a shifter lever 102, a pivot member 104, a first magnet 106, a second magnet 108, a flange 110, a circuit board 112, a microcontroller 114, a plurality of electrical connectors 116, a first sensor 118, and a second sensor 120.

The shifter lever 102 includes a first end 122 and a second end 124. The distance between the first end 122 and the second end 124 defines a length "L". The first end 122 is connected to a shift knob 126 that is useable by an operator of the motor vehicle. The shifter lever 102 is pivotally mounted to the shifter housing 101 at the pivot member 104. The pivot member 104 is generally cylindrical and has an axis of rotation "A". In one aspect, the pivot member 104 is disposed at the second end 124 of the shifter lever 102. In a first axial position, the shifter lever 102 rotates about the pivot member 104 in a first plane (not shown). The shifter lever 102 is translatable along the axis CA' of the pivot member 104 to at least a second axial position that is axially spaced from the first axial position. In the second axial position, the shifter lever 102 rotates about the pivot member 104 in a second plane (not shown) parallel to the first plane. Alternatively, the pivot member 104 is rotatingly disposed within a portion of the shifter lever 102 between the first end 122 and the second end 124.

Figure 3A:
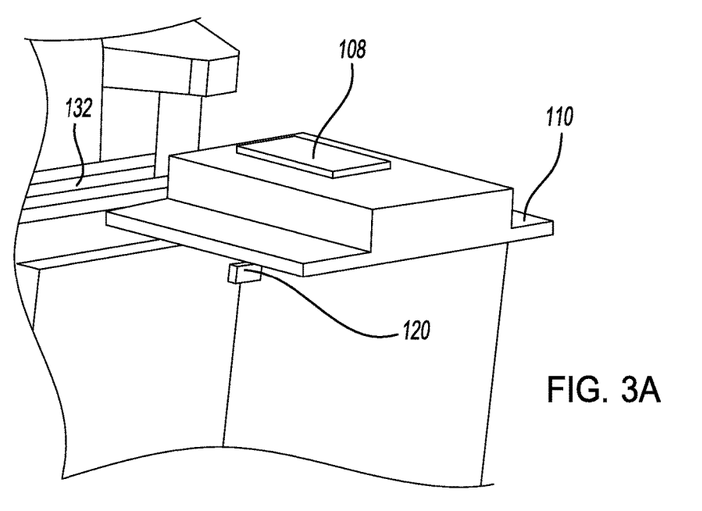
FIG. 3A is an enlarged perspective view of a portion of the shifter location system of the motor vehicle, according to the principles of the present invention.
Figure 3B:
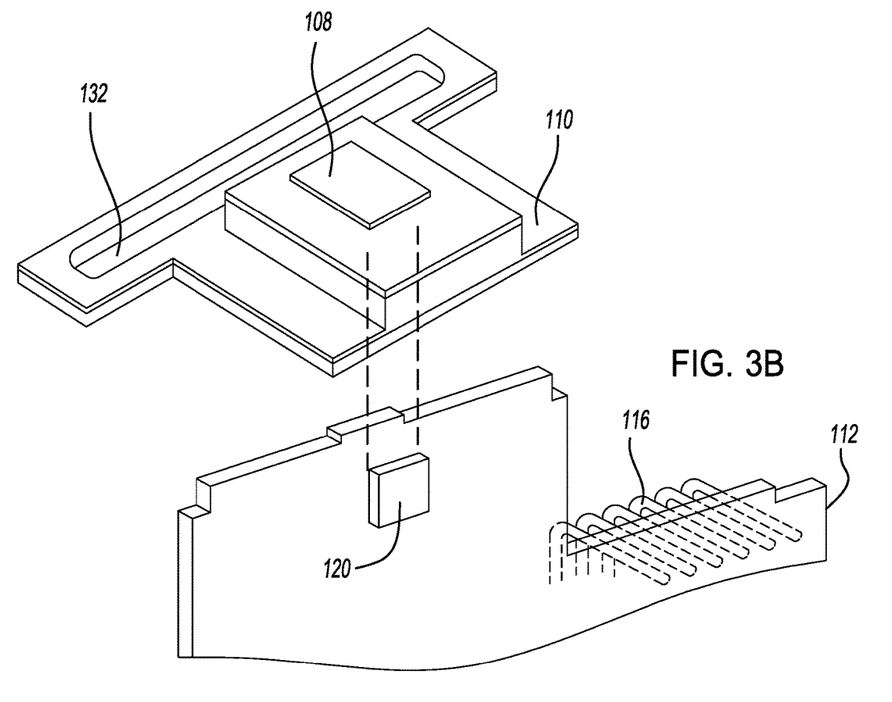
FIG. 3B. is an exploded perspective view of a portion of the shifter location system for the motor vehicle, according to the principles of the present invention.
Figure 4:
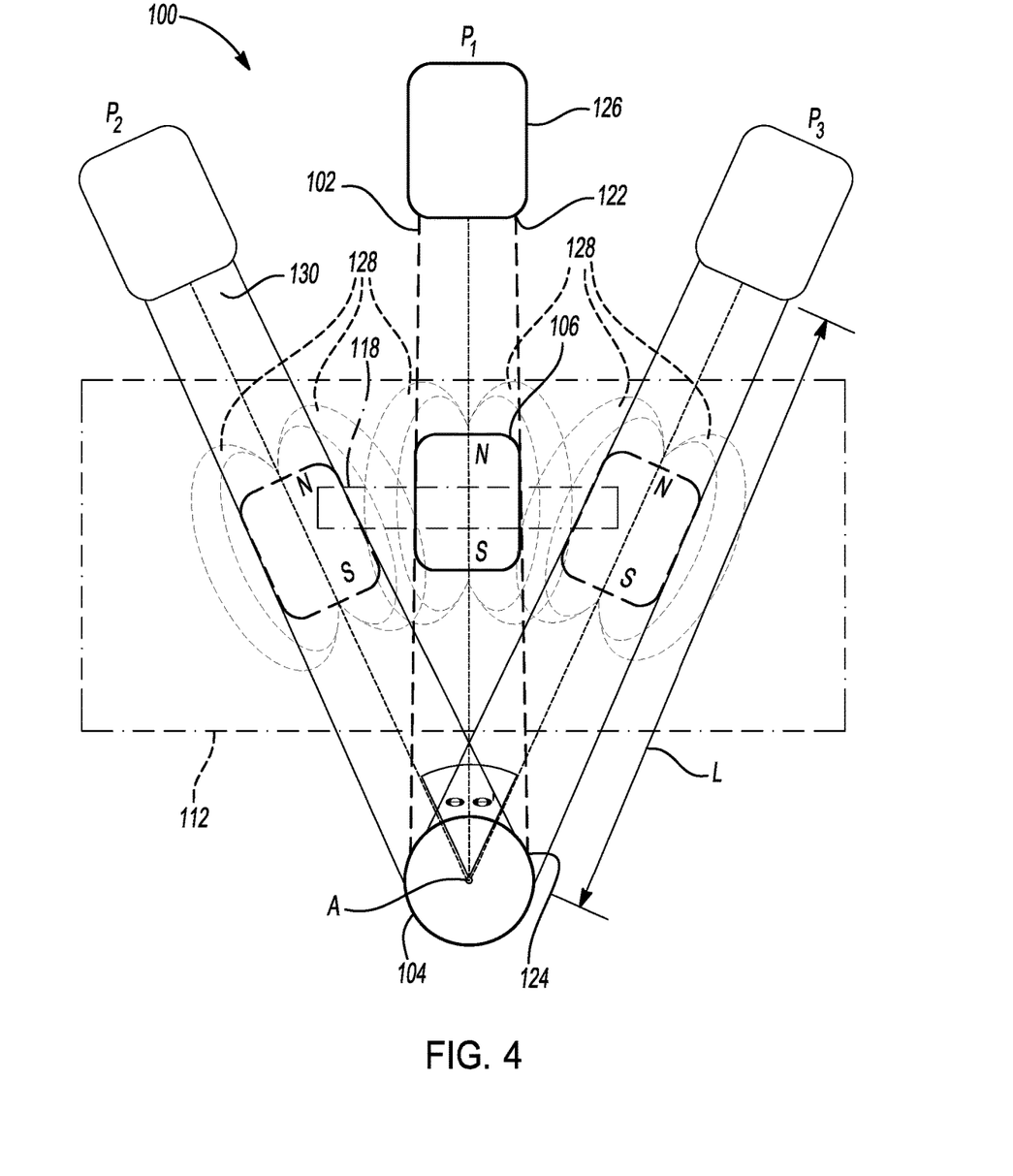
FIG. 4 is a schematic view of a portion of the shifter location system for the motor vehicle, according to the principles of the present invention.

Turning now to FIGS. 3A and 3B, and with continuing reference to FIGS. 1 and 2, the second magnet 108 is disposed on and supported by the flange 110. The flange 110 has a receiver portion 132 that is configured to receive a protrusion 134 on the side portion 130 of the shifter lever 102. In one aspect, the first magnet 106 and the flange 110 supporting the second magnet 108 are disposed on the side portion 130 of the shifter lever 102 at a position between the shift knob 126 and the pivot member 104 and/or between the pivot member 104 and the second end 124. As shown in FIG. 4, the first magnet 106 has a north pole (N) and a south pole (S) and is mounted to a side portion 130 of the shifter lever 102. Exemplary magnetic field lines between the north (N) and south (S) poles are generally indicated by the reference number 128.

The flange 110 extends perpendicularly to the first plane and the second plane and towards the circuit board 112. The circuit board 112 is fixedly disposed in the shifter housing 101 and oriented parallel to the first plane and the second plane. While the shifter lever 102 is free to pivot within the shifter housing 101, the circuit board 112 remains in a fixed position within the shifter housing. Thus, while the shifter lever 102 and the circuit board 112 lie in parallel planes, the shifter lever 102 moves relative to the circuit board 112. Additionally, the circuit board 112 is in electrical communication with the microcontroller 114 via a plurality of electrical connectors 116.

The first sensor 118 is disposed on and in electrical communication with the circuit board 112 at a position that is substantially axially adjacent to the first magnet 106 on the shifter lever 102. The first sensor 118 is an anisotropic magnetoresistance (AMR) sensor that is sensitive to the presence and angular position of a magnetic field 128. Because AMR sensors are sensitive only to the presence and angular orientation of a magnetic field 128, the first sensor 118 is robust. That is, the first sensor 118 is not sensitive to temperature variations, magnetic field 128 strength variations, contamination, or magnet aging effects. The first sensor 118 provides continuous position data to the microcontroller 114 via the circuit board 112. The first sensor 118 and the first magnet 106 are in magnetic communication.

The second sensor 120 is disposed on and in electrical communication with the circuit board 112 at a position that is substantially axially and/or radially adjacent to the second magnet 108. The second sensor 120 is sensitive to the presence of a magnetic field 128, and provides discrete position data to the microcontroller 114 via the circuit board 112. The second magnet 108 is in magnetic communication with the second sensor 120. Alternatively, the second sensor 120 and the second magnet 108 may be replaced with an electrical switch, a mechanical switch, an optical switch, or any other type of device that is able to detect the axial movement of the shifter lever 102.

Referring once more to FIG. 4, and with further reference to FIGS. 1 and 2, the pivoting movement of the shifter lever 102 is shown in greater detail. The shifter lever 102 pivots about the pivot member 104 in the first plane, while the circuit board 112 and first sensor 118 remain stationary relative to the shifter lever 102 and the first magnet 106. In one aspect, a vehicle operator manipulates the shift knob 126 to move the shifter lever 102 from a first position P1 to a second position P2, and/or to a third position P3. The second position P2 is displaced by an angle θ from the first position P1, and the third position P3 is displaced from the first position P1 by a second angle θ'. As the position of the shifter lever 102 changes from the first position P1 to the second or third positions P2, P3, thereby traversing the first angle or second angle θ, θ' the angular orientation of the magnetic field 128 emitted by the first magnet 106 also changes by the same θ for the second position P2, and the same θ' for the third position P3. Because the first sensor 118 is an AMR sensor, the first sensor 118 detects the changes in the orientation of the magnetic field 128 produced by the first magnet 106. As the first sensor 118 detects the changes in the orientation of the magnetic field 128 produced by the first magnet 106, the first sensor 118 electronically communicates the orientation change to the circuit board 112 which communicates the change in orientation to the microcontroller 114.

In a further example, as the vehicle operator moves the shift knob 126 axially relative to the pivot member 104, the shifter lever 102 translates axially along the pivot member 104. As the shifter lever 102 translates axially along the pivot member 104 relative to the stationary circuit board 112, the flange 110 and second magnet 108 move axially relative to the stationary circuit board 112. Additionally, the axial translation of the shifter lever 102 moves the second magnet 108 axially relative to the second sensor 120 on the stationary circuit board 112. As the second sensor 120 detects the change in proximity of the second magnet 108 by the presence and/or strength of the magnetic field 128 produced by the second magnet 108, the second sensor 120 electronically communicates the proximity change to the circuit board 112 which communicates the proximity change to the microcontroller 114. The microcontroller 114 interprets the proximity change and sends an output signal to the transmission. The discrete position data generated by the second sensor 120 corresponds to at least two shifter lever 102 axial positions discussed in further detail below.

The microcontroller 114 interprets changes in angular orientation and axial position of the shifter lever 102 relative to the first magnet 106 and second magnet 108, and sends an output signal to the transmission. In one aspect, the microcontroller 114 interprets the change in angular orientation and the rate of the change in angular orientation of the shifter lever 102 as an operator-created transmission operating mode request. For example, if the first position P1 of the shifter lever 102 corresponds to the Neutral drive mode, and the second position P2 corresponds to the Park drive mode, then as the operator moves the shifter lever 102 from P1 to P2, the microcontroller 114 interprets the angular orientation change of the shifter lever 102 as a request to alter the drive mode from Neutral to Park, and will command the transmission (not shown) to engage Park from the Neutral mode. The microcontroller 114 may determine, based on the rate of change in angular orientation of the shift lever 102, a rate at which a transmission clutch should be engaged. The microcontroller 114 clutch engagement determination may be based on a number of additional criteria, such as current transmission operating mode, engine speed, motor vehicle speed, and noise, vibration, and harshness thresholds.

Furthermore, in an aspect, the microcontroller 114 interprets the discrete position data generated by the second sensor 120 as a change in axial position of the shifter lever 102. The change in axial position of the shifter lever 102 is an operator-created transmission operating mode request. For example, if the operator moves the shifter lever 102 axially from a position within the first plane to a position within the second plane, the microcontroller 114 may interpret the axial change as a request to alter the drive mode from an automatic mode to a manual mode. Once in the manual mode, operator inputs that alter the angular orientation of the shifter lever 102 while in the second plane are interpreted as requests for gear ratios above or below the current transmission gear ratio. In an aspect, it should be appreciated that while the shifter lever 102 is described as translating axially along the pivot member 104, the shifter lever 102 may also rotate in a plane that is parallel to the axis of rotation 'A' through the pivot member 104.

With additional reference to FIGS. 1-4, the shifter assembly 100 creates system redundancy by using the AMR sensor and a shift-by-wire communication system between the first sensor 118 and second sensor 120, the microcontroller 114, and the transmission. More specifically, because the AMR is a sensitive magnetic field sensor, employing the magnetoresistance effect of thin-film permalloy, the first sensor 118 includes built-in mathematical certification checks. The sensor contains two parallel Wheatstone bridges which enclose a sensitive angle of 45 degrees. A rotating magnetic field 128 in a surface parallel to the sensor will therefore deliver to independent sinusoidal output signals, one following a sin $(2\theta)$ and the other following a $\cos(2\theta)$ function, where $\theta$ is the mechanical angle between the sensor and the magnetic field 128 direction. The angular measurement $\theta$ generated by the AMR sensor provides for a first redundancy check, in which the angular measurement $\theta$ is transmitted to the microcontroller 114. The $\sin^2\theta$ and $\cos^2\theta$ are added and if the resulting sum is equal to 1, then the microcontroller 114 certifies that the first sensor 118 measurement is accurate, and that the first sensor 118 is operating properly.

For example, the operator of the motor vehicle selects a shifter lever 102 position in the first plane that corresponds to Park while the motor vehicle is moving at a high rate of speed. In the example, the AMR sensor measures the angle $\theta$ of the shifter lever 102, and determines if the sum of the $\sin^2\theta$ and $\cos^2\theta$ is equal to 1, and if so, the microcontroller 114 certifies that the first sensor 118 measurement is accurate, and that the first sensor 118 is reporting properly. With further reference to the example, even if the angular measurement is accurate, the microcontroller 114 provides an additional redundancy and safety check by comparing the motor vehicle speed to a predetermined threshold motor vehicle speed below which the Park transmission setting may be engaged. If the motor vehicle speed has not met the threshold motor vehicle speed, the microcontroller 114 will prevent the transmission from engaging Park to avoid damage to the transmission, and unsafe operating conditions for the motor vehicle operator. Likewise, if the operator selects the manual mode by moving the shifter lever 102 axially into the second plane and then alters the angular orientation of the shifter lever 102 within the second plane to request a transmission gear ratio that is inappropriate for the current motor vehicle speed, then the microcontroller 114 will similarly nullify the operator request after performing the first redundancy check, as discussed above, and then comparing current motor vehicle speed to a predetermined threshold speed for the operator-requested gear ratio. If the predetermined threshold speed has not been met, the microcontroller 114 will ignore the operator request and prevent the transmission from engaging the operator-requested gear ratio.

In one aspect, because the first sensor 118 is an AMR sensor, and the first magnet 106 is positioned between the shift knob 126 and the pivot member 104, the length "L" of the shifter lever 102 allows the shifter assembly 100 to be compact, and the AMR sensor allows the assembly to be portable, robust, and flexible.

The features and components of the present disclosure described above are merely exemplary in nature. Variations that do not depart from the gist of the disclosure are intended to be within the scope of the disclosure. Such variations are not to be regarded as a departure from the spirit and scope of the disclosure.

What is claimed is:

1. A shifter assembly in a motor vehicle, the shifter assembly comprising:
    a shifter housing;
    a shifter lever having a first end and a second end, the shifter lever coupled to the shifter housing at the second end, wherein the shifter lever is rotatable about a pivot axis at the second end and is translatable in a direction generally parallel to the pivot axis;
    a first 2-Dimensional (2D) magnetic sensor;
    a first magnet having a first magnetic field, wherein the first magnet is coupled to the shifter lever between the first end and the second end, and the first magnet is disposed proximate the first 2D magnetic sensor;
    a second 2D magnetic sensor; and
    a second magnet having a second magnetic field, wherein the second magnet is coupled to the shifter lever between the first end and the second end, and the second magnet is disposed proximate the second 2D magnetic sensor, wherein the first magnetic field is in radial alignment with the shifter lever and the second magnetic field is oriented perpendicular to the first magnetic field, and wherein the first 2D magnetic sensor detects an angular displacement of the first magnetic field when the shifter lever is rotated, and the second 2D magnetic sensor detects an axial displacement of the second magnetic field relative to the pivot axis when the shifter lever is translated.

2. The shifter assembly of claim 1 wherein the first 2D magnetic sensor detects an angular orientation of the first magnetic field, and the second 2D magnetic sensor detects an angular orientation of the second magnetic field.

3. The shifter assembly of claim 2 wherein at least one of the first and second 2D magnetic sensors is an anisotropic magnetoresistance (AMR) sensor.

4. The shifter assembly of claim 2 wherein at least one of the first and second 2D magnetic sensors is a Hall-Effect sensor.

5. The shifter assembly of claim 2 wherein the first and the second 2D magnetic sensors are AMR sensors.

6. The shifter assembly of claim 5 wherein the first magnet is disposed axially adjacent the second magnet.

7. The shifter assembly of claim 6 wherein the first 2D magnetic sensor is configured to detect a rotational movement of the first magnet relative to the pivot axis.

8. The shifter assembly of claim 7 wherein the second 2D magnetic sensor is configured to detect a movement of the second magnet in an axial direction relative to the pivot axis.

9. The shifter assembly of claim 8 wherein the first 2D magnetic sensor and the second 2D magnetic sensor are configured to detect a movement of the first magnet and the second magnet in both the rotational and the axial directions relative to the pivot axis.

10. A shifter location system in a motor vehicle, the system comprising:
- a shifter housing;
- a shifter lever having a first end, a second end, and a flange, the shifter lever being disposed within the shifter housing and rotatably coupled to the shifter housing at the second end, wherein the shifter lever has a pivot axis at the second end and is translationally moveable in a direction generally parallel to the pivot axis, and wherein the flange is disposed between the first and second ends of the shifter lever;
- a circuit board disposed within the shifter housing, the circuit board being disposed adjacent to the shifter lever in a plane perpendicular to the pivot axis of the shifter lever;
- a first two-dimensional (2D) magnetic sensor disposed on a first side of the circuit board and in electrical communication with the circuit board;
- a first magnet having a first magnetic field, wherein the first magnet is coupled to the shifter lever between the first end and the second end, and the first magnetic field is in radial alignment with the shifter lever, and wherein the first magnet is disposed adjacent to the first 2D magnetic sensor such that the first 2D magnetic sensor is in magnetic communication with the first magnet;
- a second 2D magnetic sensor disposed on a second side of the circuit board and in electrical communication with the circuit board, wherein the second side of the circuit board is disposed proximate to the flange;
- a second magnet having a second magnetic field, wherein the second magnet is coupled to the flange of the shifter lever, and the second magnetic field is oriented perpendicular to the first magnetic field, wherein the second magnet is disposed adjacent to the second 2D magnetic sensor such that the second 2D magnetic sensor is in magnetic communication with the second 2D magnet, and wherein the first 2D magnetic sensor detects an angular displacement of the first magnetic field, and the second 2D magnetic sensor detects an axial displacement of the second magnetic field relative to the pivot axis.

11. The system of claim 10 wherein the first 2D magnetic sensor detects an angular orientation of the first magnetic field, and the second 2D magnetic sensor detects an angular orientation of the second magnetic field.

12. The system of claim 10 wherein at least one of the first and second 2D magnetic sensors is a Hall-Effect sensor.

13. The system of claim 10 wherein the first 2D magnetic sensor and the second 2D magnetic sensor are anisotropic magnetoresistance (AMR) sensors.

14. The system of claim 13 wherein the first magnet is disposed axially adjacent the second magnet.

15. The system of claim 14 wherein the first 2D sensor is configured to detect a rotational displacement of the first magnet.

16. The system of claim 15 wherein the second 2D sensor is configured to detect an axial displacement of the second magnet.

17. The system of claim 16 wherein the first 2D sensor and the second 2D sensor are configured to detect a movement of the first magnet and the second magnet in both the rotational and the axial directions relative to the pivot axis.

18. A shifter location system in a motor vehicle, the system comprising:
- a shifter housing;
- a shifter lever having a first end and a second end, the shifter lever being disposed within the shifter housing and rotatably coupled to the shifter housing at the second end, wherein the shifter lever has a pivot axis at the second end and is translationally moveable in a direction generally perpendicular to the pivot axis;
- a circuit board disposed within the housing;
- a first anisotropic magnetoresistance (AMR) sensor disposed on and in electrical communication with the circuit board;
- a first magnet having a first magnetic field, wherein the first magnet is coupled to the shifter lever between the first end and the second end, the first magnetic field is oriented in radial alignment with the shifter lever, and the first magnet is disposed proximate the first AMR sensor;
- a second AMR sensor disposed on and in electrical communication with the circuit board;
- a second magnet having a second magnetic field,
  wherein the second magnet is coupled to the shifter lever between the first end and the second end, the second magnetic field is oriented perpendicular to the first magnetic field, and the second magnet is disposed proximate the second AMR sensor, and wherein the first AMR sensor detects an angular displacement of the first magnetic field, and the second AMR sensor detects an axial displacement of the second magnetic field.

19. The system of claim 18 wherein the first magnet is disposed axially adjacent the second magnet.

20. The system of claim 19 wherein the first AMR sensor is disposed axially adjacent to the first magnet, and the second AMR sensor is disposed radially adjacent the second magnet.

* * * * *